United States Patent [19]

Struve et al.

[11] Patent Number: 5,096,373
[45] Date of Patent: Mar. 17, 1992

[54] INTEGRATED FORCED CONVECTION AIR COOLING SYSTEMS

[75] Inventors: Dimitry Struve, Mountain View; James G. Ammon, San Jose; Philip G. Yurkonis, Campbell, all of Calif.

[73] Assignee: Sun Microsystems, Inc., Mountain View, Calif.

[21] Appl. No.: 658,974

[22] Filed: Feb. 21, 1991

[51] Int. Cl.⁵ ............... F04D 17/02; H04K 7/20
[52] U.S. Cl. ................... 415/60; 415/223; 415/214.1; 415/219.1; 310/71
[58] Field of Search .......... 415/214.1, 215.1, 223, 415/208.1, 208.2, 208.3, 211.2, 182.1, 60; 310/40.5, 71, 174, 439

[56] References Cited

U.S. PATENT DOCUMENTS

| | | | |
|---|---|---|---|
| 2,936,109 | 5/1960 | Copeland | 415/211.2 |
| 4,120,615 | 10/1978 | Keem et al. | 415/214.1 |
| 4,137,709 | 2/1979 | Gongwer | 415/222 |
| 4,490,636 | 12/1984 | McBratney | 310/71 |
| 4,657,483 | 4/1987 | Bede | 415/222 |
| 4,661,733 | 4/1987 | Heyraud | 310/71 |
| 4,710,096 | 12/1987 | Erlam | 415/214.1 |
| 4,767,262 | 8/1988 | Simon | 415/60 |
| 4,773,828 | 9/1988 | Hagiwara et al. | 310/71 |

Primary Examiner—Edward K. Look
Assistant Examiner—Michael S. Lee
Attorney, Agent, or Firm—Blakely Sokoloff Taylor & Zafman

[57] ABSTRACT

A fan assembly with a single fan housing that has at least one fan passage adapted to allow air to flow through the housing. A separate fan subassembly is snapped into a motor housing formed within the passages of the fan housing. The subassembly includes an electric motor that rotates an impeller. The rotation of the impeller creates an airflow through the air passage. Attached to the surface of the housing is a conductor that extends from the motor, to an electrical connector that supplies power to the motor from an external power source. The air passage has rounded entrances and is formed such that the passage is shaped like a venturi tube. The rounded edges reduce the head loss through the passage by an order of magnitude, decreasing the pressure drop across the housing and improving the overall efficiency of the fan.

23 Claims, 2 Drawing Sheets

INTEGRATED FORCED CONVECTION AIR COOLING SYSTEMS

BACKGROUND OF THE INVENTION

1. Field of the Invention

This invention relates to fan assemblies used to direct air flow.

2. Background of Related Art

Because of the heat generated in electronic systems there is usually a fan incorporated to blow air across the electrical devices and cool down the components. The fans typically have openings with sharp edges that create high head losses at the openings. The head losses produce large pressure drops across the fan unit, reducing airflow and lowering the cooling efficiency of the fan. Large computers typically have a plurality of fan units attached to a mounting bracket that is connected to the frame of the computer. The units are typically separated within the mounting bracket to allow wiring to be placed in between the fans. The spaces between the units create vortices in the fluid stream that interrupt the airflow and further degrade the efficiency of the fans. The turbulence created by the sharp edge openings and mounting spaces also produces a high level of noise.

The multiple fan assemblies are also somewhat time consuming to assemble and repair. For instances, a typical assembly includes mounting each fan unit into the mounting bracket with a plurality of screws, installing and connecting wires and connectors into each fan, and then fastening a finger guard onto an entrance of each fan passage. To repair one of the fans, the unit must be disassembled in reverse order. It would therefore be desirable to have a single fan assembly with minimal parts and aerodynamic features to maximize the cooling efficiency of the fans.

SUMMARY OF THE INVENTION

The present invention is a fan assembly with a single homogeneous fan housing, that has at least one fan passage adapted to allow air to flow through the housing. A separate fan subassembly is snapped into a motor housing formed within the passages of the fan housing. The subassembly includes an electric motor that rotates an impeller. The rotation of the impeller creates an airflow through the air passage. Attached to the surface of the housing is a conductor that extends from the motor, to an electrical connector that supplies power to the motor from an external power source. The conductor completely eliminates the need for separate external wiring, decreasing the assembly time of the fan. The fan units can be easily assembled and repaired by simply snapping in the fan subassemblies, greatly reducing the manufacturing and maintenance cost of the fan.

The air passage has rounded entrances and is formed such that the passage is shaped like a venturi tube. The rounded edges reduce the head loss through the entrance by an order of magnitude, decreasing the pressure drop across the housing and improving the overall efficiency of the fan. In the preferred embodiment, the housing has four fans with adjacent rounded edges that reduce any vortices and dead spots that form around the passages, thereby increasing the airflow through the fan.

Therefore it is an object of this invention to provide a commercially available fan assembly that incorporates aerodynamic features to greatly reduce the pressure drop across the assembly and reduce the noise level therein.

It is also an object of this invention to provide a commercially available fan assembly that can be readily and easily assembled and repaired.

BRIEF DESCRIPTION OF THE DRAWINGS

The objects and advantages Of the present invention will become more readily apparent to those skilled in the art after reviewing the following detailed description and accompanying drawings, wherein.

DETAILED DESCRIPTION OF THE INVENTION

Figure 1:
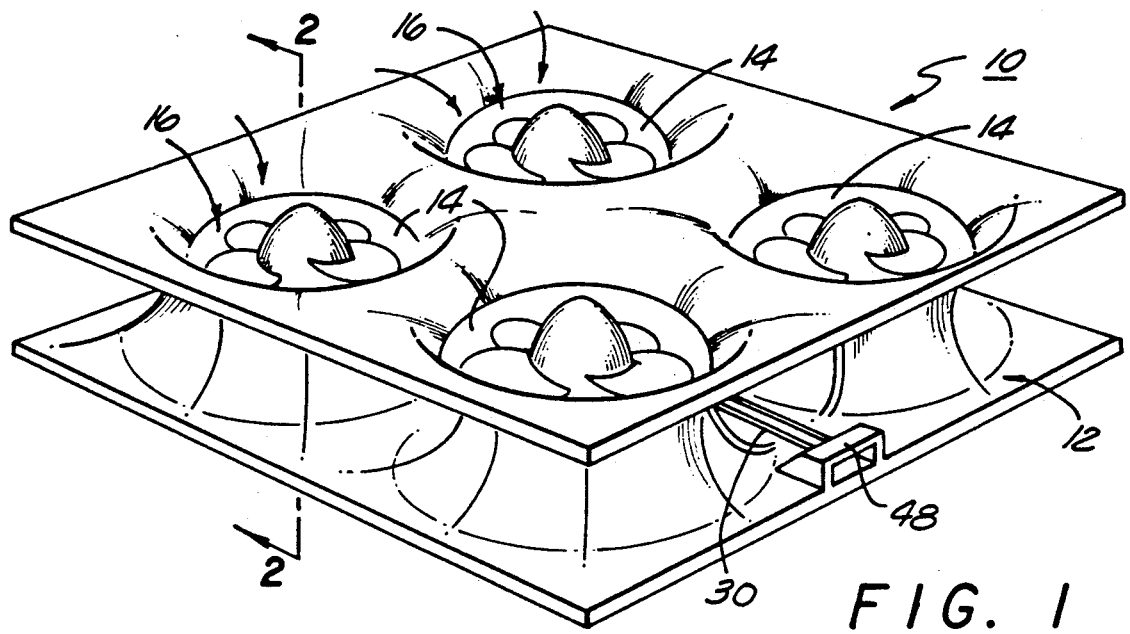
FIG. 1 is a perspective view of a fan assembly of the present invention showing four fans within a single molded plastic fan housing.

Referring to the drawings more particularly by reference numbers, FIG. 1 shows a fan assembly 10 of the present invention. The fan assembly 10 has a fan housing 12 formed as one piece. The housing is preferably an injected molded hard plastic that can be readily produced in mass quantities. The plastic material is both light and strong and is susceptible to being formed into a variety of different shapes. In the preferred embodiment there are four air passages 14 formed in the housing 12 to allow air 16 to flow through the assembly 10. Although four passages are shown it is understood that any number of passages can be formed including one, wherein the assembly is a single fan unit. As more clearly shown in FIG. 2 the housing 12 has rounded edges 18 at the entrance 20 and exit 22 of each air passage 14. The passages 14 also have an inward radius so that the entire passage is shaped as a venturi. The rounded edges 18 provide the smallest amount of head loss possible, such that there is a minimal pressure drop going into and out of the passage 14. The radius of the passage 14 also eliminates any sudden change in area, which provides a highly efficient air passage. The housing 12 is designed such that the passage openings are immediately adjacent to each other, so that the air 16 flows smoothly into the passages 14 as shown in FIG. 1. Such an arrangement decreases the amount of vortices and prevents dead spots, thereby increasing the airflow of the assembly 10 over multiple fan units previously found in the art. The combination of adjacent rounded openings and venturi shaped passages also increases the airflow through the passages and increases the overall cooling capacity of the assembly 10, producing a highly efficient fan. One of the main advantages of the rounded edges is the reduction of turbulence in the airstream, which greatly reduces the noise level of the fan assembly.

Figure 2:
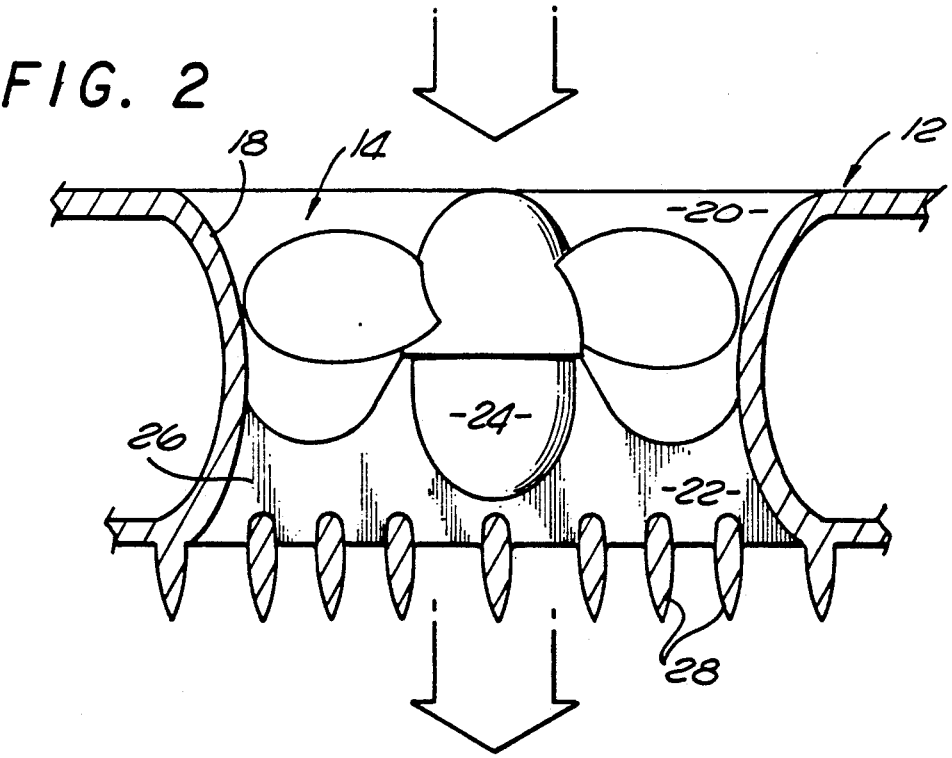
FIG. 2 is a cross-sectional side view of an air passage of the fan housing taken at line 2—2 of FIG. 1.
Figure 3:
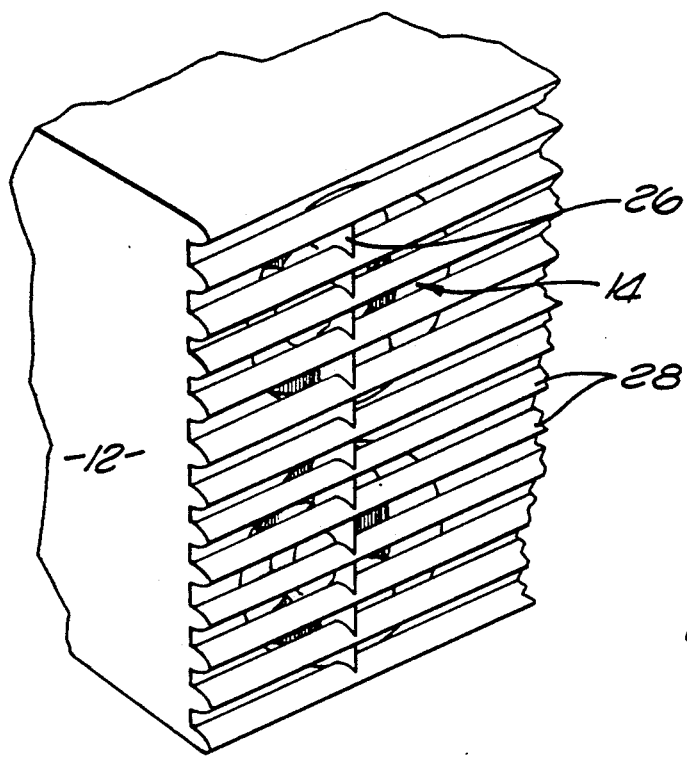
FIG. 3 is a perspective view of a portion of one side of the fan assembly showing a finger guard formed into the fan housing at one of the air passage entrances.

The assembly 10 also has four motor housings 24 each connected by a strut 26 that extends across the exit of the air passage 14. The struts 26 and motor housings 24 are molded with the housing 12. The housing 24 is tapered and rounded to prevent any sudden changes in the area of the air passage 14. As shown in FIG. 3 the assembly 10 may have a plurality of spaced apart bars 28 that are formed into the housing 12 and attached to the struts 26. The bars 28 are close enough together so that a human finger may not enter the passage 14. The assembly 10 is typically mounted into a computer, so that the bars 28 are exposed on the outside of the electronic box. In such an arrangement the bars 28 function as a finger guard to prevent someone from getting injured and/or the fan from being damaged. The bars 28 can also function as a shade, so that a user cannot see the inside of the computer through the air passage 14. As shown in FIG. 2 the bars 28 can have a teardrop shape, so that the bars 28 create minimal drag on the air 16 exiting the passages 14. Although the bars 28 are shown formed into the housing 12, as an alternative, a separate grill may be attached to the housing 12 that is constructed independently of the plastic form. Using a separate grill would increase the assembly time of the fan 10, but would reduce the complexity and cost of the molded housing 12. As another cost saving alternative the housing 12 itself may be molded into two pieces and then bonded together as one piece.

Figure 4:
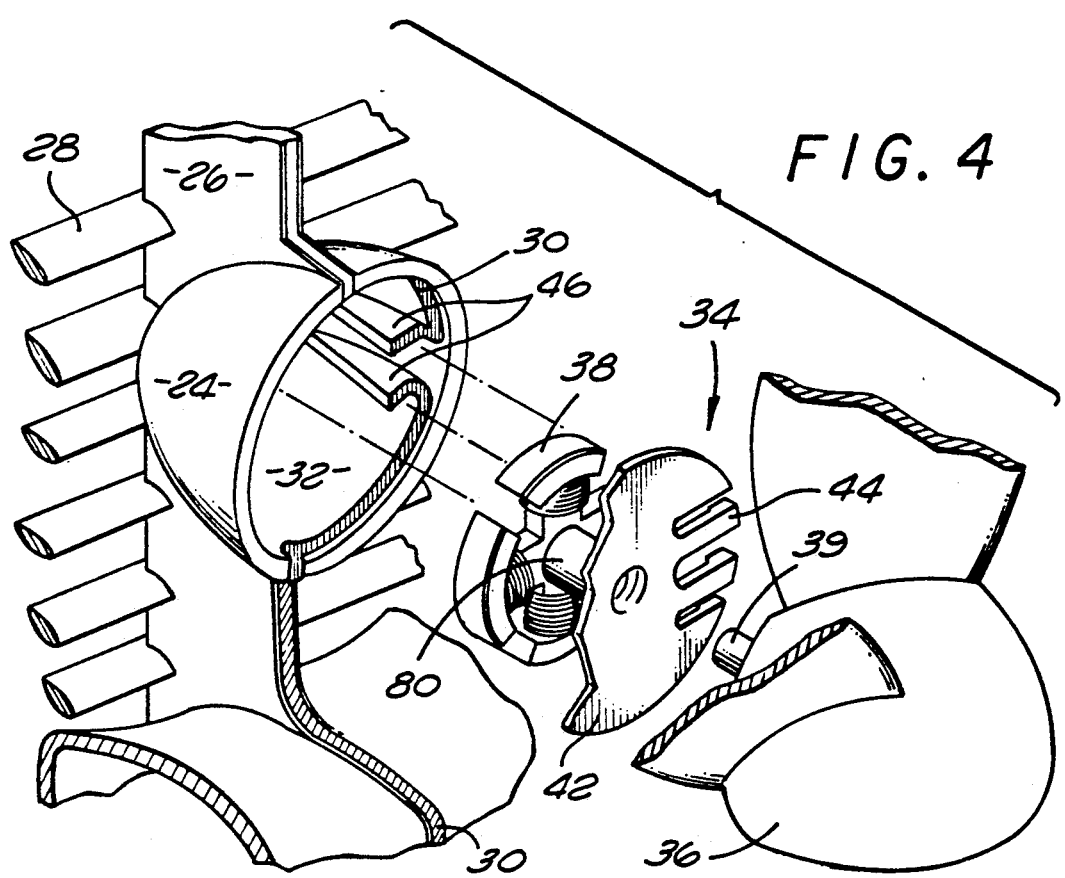
FIG. 4 is an exploded view of a fan subassembly that is snapped into a motor housing which is formed in the fan housing.

As shown in FIGS. 1 and 4, a plurality of electrical conductors 30 run along the surface of the housing 12. The conductors 30 are preferably plated onto the plastic. The conductors 30 are routed into the cavity 32 of the motor housing 24 as shown in FIG. 4. The motor housing 24 holds a fan subassembly 34 that has an impeller 36 connected to an electric motor winding 38. The impeller 36 has a shaft 39 that extends through a bearing housing 40 that contains a tearing, wherein the impeller 36 is allowed to rotate relative to the bearing housing 40. Integral with the bearing housing 40 is a plate 42 that has a pair of fingers 44. The bearing housing 40, plate 42 and fingers 44 are preferably molded as a single plastic piece that has plated conductors 30 routed throughout the plate 42. The plate 42 can function as a printed circuit board, wherein discrete electrical devices can be soldered onto the plate 42. The motor windings 38 can be attached to the bearing housing 40 and the ends of the wires can be soldered to conductors 30 on the plate 42. The motor housing 24 may have a metal spring or other means that allow the subassembly 34 to be snapped into the housing 24. The diameter of the housing 24 and plate 42 are such that the plate 42 enters the cavity 32 to a depth so that the fingers 44 are deflected by two flanges 46 within the housing 24. This insures a positive contact between the conductors on the inside of the fingers 44 and the conductors on the end of the flanges 46 as shown. The conductors 30 supply power to the electric motor 38, to turn the impeller 36 and create an airflow through the passage 14. As shown in FIG. 1, the assembly 10 may have a connector shell 48 formed into the housing 12. An electrical connector may be inserted into the shell 48 and soldered to the conductors 30, whereby the connector is attached to an external power supply that provides power to the electric motors 38.

As shown in FIG. 2 the struts 26 and motor housing 24 can be designed to have a sufficient space between the strut 26 and the impeller 36, to reduce the noise level of the fan. It has been found that previous fans have the impeller 36 located too close to the strut 26, wherein the airstream causes the strut and fan assembly to vibrate and produce an undesirable amount of noise. With the present design, the turbulence around the strut is reduced, resulting in a much quieter fan. In addition, the consolidation of the previous fan units and mounting bracket into one homogeneous unit, further reduces the amplitude of any vibrational loading and creates a quiet running fan. What has now been described is a multiple fan unit that can be assembled by merely snapping in the fan subassemblies and attaching an external connector. The fan motor 38 can be easily repaired by merely replacing the fan subassembly 34.

While certain exemplary embodiments have been described in detail and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

We claim:
1. An integrated fan assembly, comprising:
a homogeneous fan housing having at least one air passage extending through said fan housing adapted to allow air to flow through said air passage, said fan housing having an integrally extended motor housing formed within said air passage;
a fan subassembly adapted to be attached to said motor housing, said fan subassembly including an electric motor attached to an impeller that is capable of rotating said impeller to create an airflow through said air passage; and,
at least one conductor plated onto said fan housing to provide power to said electric motor.
2. The assembly as recited in claim 1, wherein said fan subassembly has at least one plastic metal plated spring adapted to be pressed into said motor housing such that there is an electrical connection between said conductor on said fan housing and said electric motor.
3. The assembly as recited in claim 1, wherein said air passage has rounded openings and is shaped such that said air passage approximates a venturi.
4. The assembly as recited in claim 1, further comprising a plurality of spaced apart bars connected to said fan housing in at least one opening of said air passages, said bars being separated such that a human finger cannot enter said air passage.
5. The assembly as recited in claim 4, wherein said bars are integrally formed into said fan housing.
6. The assembly as recited in claim 1, wherein there are four air passages, motor housing and attachable fan subassemblies.
7. The assembly as recited in claim 1, wherein said fan housing has a connector shell integrally formed into said fan housing.
8. The assembly as recited in claim 1, wherein said fan housing is constructed from plastic.
9. An integrated fan assembly, comprising:
a homogeneous fan housing having at least two air passages extending through said fan housing each adapted to allow air to flow through said air passage, said air passages being adjacent and separated by a rounded wall, said fan housing further having an integrally extended motor housing formed within said air passage;
a fan subassembly adapted to be attached to said motor housing, said fan subassembly including an electric motor attached to an impeller that is capable of rotating said impeller to create an airflow through said air passage.

10. The assembly as recited in claim 9, further comprising at least one conductor plated onto said fan housing.

11. The assembly as recited in claim 9, wherein said fan subassembly has at least one plastic metal plated spring adapted to be pressed into said motor housing such that there is an electrical connection between said conductor on said fan housing and said electric motor.

12. The assembly as recited in claim 9, further comprising a plurality of spaced apart bars connected to said fan housing in at least one opening of said air passages, said bars being such that a human finger cannot enter said air passage.

13. The assembly as recited in claim 12, wherein said bars are integrally formed into said fan housing.

14. The assembly as recited in claim 9, wherein there are four air passages, motor housings and attachable fan subassemblies.

15. The assembly as recited in claim 9, wherein said fan housing has a connector shell integrally formed into said fan housing.

16. The assembly as recited in claim 9, wherein said fan housing is constructed from plastic.

17. An integrated fan assembly, comprising:
a homogeneous fan housing having four air passages extending through said fan housing adapted to allow air to flow through said air passages, said air passages have adjacent openings and are shaped such that each said air passage approximates a venturi, said fan housing further having four integrally extended motor housings formed within said air passages;
four fan subassemblies attached to said motor housings, each said fan subassembly including an electric motor attached to an impeller that is capable of rotating said impeller to create an airflow through said air passage; and,
a plurality of conductors plated onto said fan housing surface to provide power to said electric motors.

18. The assembly as recited in claim 17, wherein said fan housing is constructed from plastic.

19. The assembly as recited in claim 18, further comprising a plurality of spaced apart bars connected to said fan housing in at least one opening of said air passages, said bars being separated such that a human finger cannot enter said air passages.

20. The assembly as recited in claim 19, wherein said bars are integrally formed into said fan housing.

21. The assembly as recited in claim 20, wherein said fan housing has a connector shell integrally formed into said fan housing.

22. An integrated fan assembly, comprising:
a fan housing having at least one air passage extending through said fan housing adapted to allow air to flow through said air passage, said fan housing having an integrally extended motor housing formed within said air passage;
a fan subassembly adapted to be attached to said motor housing, said fan subassembly including an electric motor attached to an impeller that is capable of rotating said impeller to create an airflow through said air passage; and,
a connector that electrically couples said motor to a source of power, said connector having a conductor plated to said fan subassembly that is adapted to be pressed into contact with a conductor plated onto said fan housing.

23. The assembly as recited in claim 22, wherein said connector means includes at least one plastic metal plated spring adapted to be pressed into said motor housing such that there is an electrical connection between said conductor on said fan housing and said electric motor.

* * * * *